July 31, 1945.  M. DURST  2,380,687
FAUCET ATTACHMENT
Filed Nov. 9, 1944
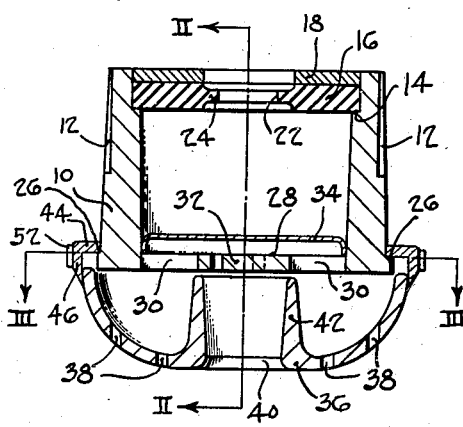
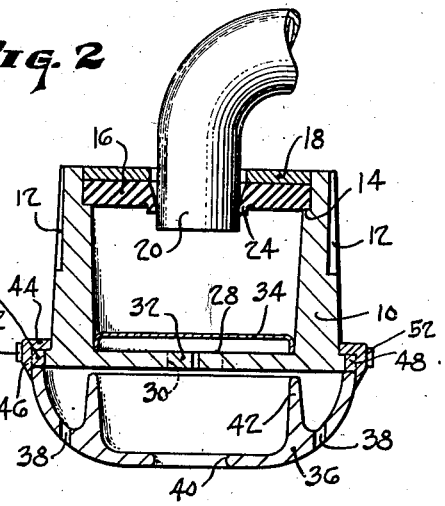
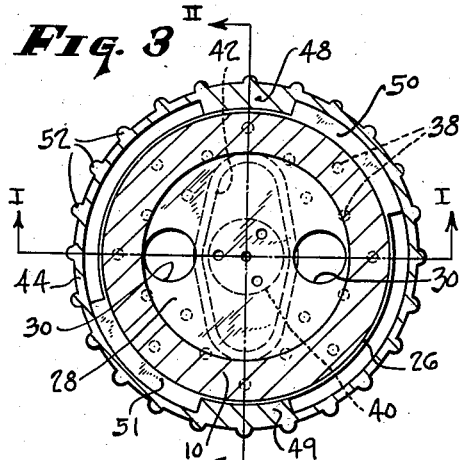
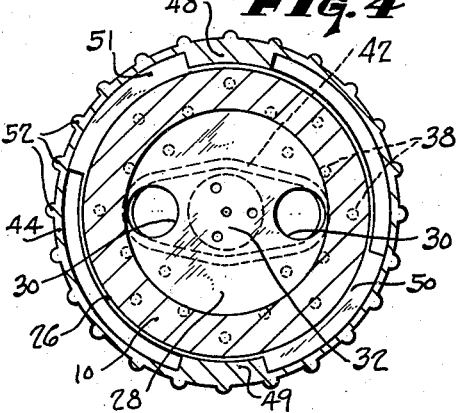
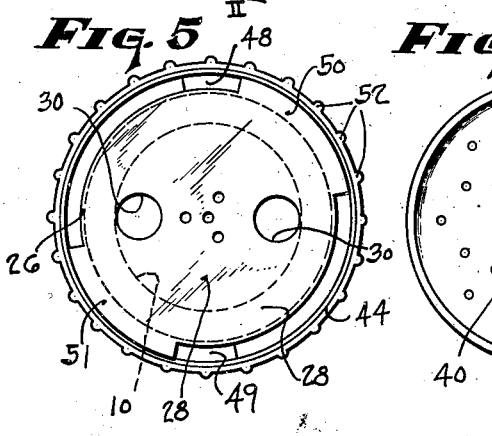
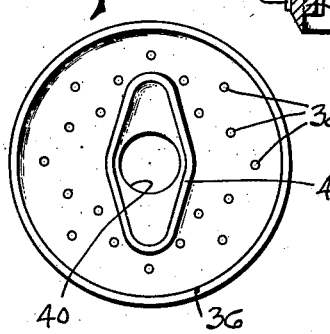
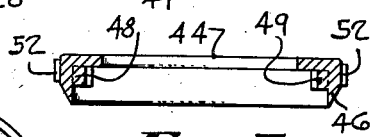
INVENTOR
Max Durst
BY Louis Necks
ATTORNEY Patented July 31, 1945

2,380,687

UNITED STATES PATENT OFFICE 2,380,687

FAUCET ATTACHMENT

Max Durst, Philadelphia, Pa.

Application November 9, 1944, Serial No. 562,713

12 Claims. (Cl. 299—144)

This invention relates to a faucet attachment of the type which is adapted to be detachably connected to a faucet for producing a solid stream or a spray and for preventing splashing, irrespective of whether a solid stream or a spray is produced.

The object of the invention is to produce an improved faucet attachment of the type set forth.

In the accompanying drawing

Fig. 1 is a vertical section of a faucet attachment embodying my invention, shown detached;

Fig. 2 is a section on line 2—2 of Fig. 1, showing the attachment applied to a faucet.

Fig. 3 is a section on line 3—3 of Fig. 1, showing the attachment adjusted to produce a spray;

Fig. 4 is a view similar to Fig. 3, showing the attachment adjusted to produce a solid stream;

Fig. 5 is a reduced bottom plan view of Fig. 1, with the bottom cup-shaped member and the faucet omitted;

Fig. 6 is a reduced top plan view of the bottom cup-shaped member of Fig. 1, shown detached; and Fig. 7 is a sectional view of a ring-like member which rotatably connects the bottom cup-shaped member of Fig. 6 to the body of the attachment, as shown in Fig. 1.

Referring now in more detail to the drawings, 10 designates a cylindrical member which constitutes the body of the attachment. The body 10 may be made of metal or rubber but is preferably made of plastic and has sufficient rigidity. In order to facilitate handling, a portion of the body 10 is preferably knurled, as at 12. The upper end of the body 10 is internally counterbored or recessed to provide a shoulder 14 for receiving and seating a gasket 16. The gasket 16 is made of resilient, compressible material, such as rubber, and the peripheral portion thereof is sufficiently thick so as to be self-supporting under the pressure to which it may be subjected in use. The gasket is compressed and held in position by a rigid washer 18. The washer may be made of any desired material and is secured in position flush with the top edge of the body 10 in any desired manner. Preferably, the body 10 and the washer 18 are both made of a thermoplastic and are preferably integrated by heat treatment in the well-known manner. The washer 18 is provided with a central opening to permit insertion of the discharge end 20 of a faucet, spigot or the like. Likewise, the gasket 16 is provided with a central opening 22 through which the end of the faucet may be inserted in a snug fit, producing a fluid-tight joint between the gasket and the faucet. In order to facilitate insertion of the end of the faucet and still insure a leakproof joint, the portion of the gasket which surrounds the opening 22 is reduced in thickness to form a readily yielding rim 24 through which the end of the faucet is inserted. When the attachment is applied to a faucet, the rim 24 is distorted from its position in Fig. 1 and assumes an inverted frusto-conical form, as shown in Fig. 2. In this position, the distended lower edge of the relatively thin rim tightly hugs the exterior of the spigot to guarantee a fluid-tight joint.

The body 10 is provided with an outer flange 26 and a bottom wall 28. The bottom wall is provided with two spaced openings 30 and a central perforated portion 32. A fine mesh screen 34 is seated on or is otherwise supported between the bottom wall 28 and the opening 22. The screen 34 serves to break up the stream of water flowing through the faucet, thus preventing or reducing the splash which otherwise usually occurs, particularly when the water pressure is high and the faucet is fully opened.

Coacting with the body 10 is a cup-shaped member 36, the curved side wall of which is provided with small perforations 38. The bottom of the cup-shaped member is provided with a circular opening 40 and with an upstanding wall 42 defining a generally oval or elongated compartment, which is clearly shown in Figs. 2, 3, 4 and 6. The wall 42, and the bottom of the cup-shaped member enclosed thereby, are not perforated, so that water delivered to the compartment, through the openings 30 and the perforated portion 32, will emerge as a solid stream through the opening 40. The cup-shaped member is rotatably secured to the body 10 by means of a ring 44 seated on the flange 26 and having a pendant flange 46 which is secured to the upper rim of the cup-shaped member in any suitable manner. The cup-shaped member 36 and the ring 44 are preferably made of thermo-plastic and are integrated by heat treatment. The ring 44 and the cup-shaped member 36 are thus rotatable together with reference to the body 10 of the attachment. In order to limit the rotation of the cup-shaped member to about 90 degrees, the ring 44 is provided with stops 48 and 49 which are adapted to abut against stops 50 and 51 forming part of or carried by the body 10. The flange 46 of the ring 44 is preferably knurled, as at 52.

Operation

When it is desired to produce a spray, the cup-shaped member is rotated, by means of the ring 44, to the position shown in Fig. 3, in which the elongated compartment defined by the wall 42 is out of registration with the openings 30 in the bottom wall 28, so that water flowing through the openings 30 will flow into the perforated portion of the cup-shaped member 36 surrounding, or outside of, the wall 42. Also, water will flow in a spray through the perforations in the central bottom wall portion 32 which registers with the opening 40, so that the resultant spray will be equal to the entire area of the cup-shaped member. In this position, the stop 48 abuts against the stop 50 and the stop 49 abuts against the stop 51. When it is desired to produce a solid stream, the cup-shaped member is rotated to the position shown in Fig. 4. In this position, the ends of the oval compartment defined by the wall 42 register with the openings 30 so that water flowing through these openings and through the perforated bottom wall portion 32 will flow into the oval shaped, imperforate compartment within the wall 42, and out through the opening 40. In this position, the stop 48 abuts against the stop 51 and the stop 49 abuts against the stop 50.

According to my invention, I prefer to make the attachment of any suitable thermo-plastic material which can be readily die cast or molded, whereby a light and inexpensive structure is produced in one or more colors. The various parts of the attachment are provided with proper draft so that the body member, the washer, the ring and the cup-shaped member can each be made in one operation and so that the washer and the cup-shaped member may be heat-soldered to the body member and ring, respectively, in one operation. Such operation will merely involve placing the assembled attachment in a jig or die and subjecting the junction of the washer and the body and the junction of the cup-shaped member and the ring to heat sufficient to melt or fuse the plastic substance. The screen may be made of metal in the usual way, or it may also be made of plastic.

It will also be noted that, according to my invention, the water flowing from the spigot can be made to flow in a solid stream or in a spray by merely turning the cup-shaped member through an arc of 90 degrees, as distinguished from similar devices heretofore known and used, which, as far as I am aware, used pivoted shutters for closing the central, solid stream opening, said shutters having operating handles which extended beyond the cylindrical periphery of the attachment. The shutter operating handles were necessarily made thin and narrow so that they were relatively fragile, and once the operating handle was broken, the entire attachment had to be discarded. Furthermore, such attachments are mostly used on kitchen sink faucets, where the protruding operating handle is objectionable, in that it might catch on a cup or dish being washed and rapidly manipulated in the immediate vicinity of the faucet. A still further advantage is that the cup-shaped member of my invention can be rotated by either hand, whereas an attachment embodying a pivoted shutter can only be conveniently operated by one hand or the other, according to the location of the operating handle.

What I claim is:

1. A faucet attachment including a first body having an upper opening adapted to receive and engage the discharge end of a faucet or the like, and a bottom wall having an aperture therein, a second body having a bottom opening and means defining a compartment within said second body including said bottom opening, at least a portion of said second body lying outside of said compartment being perforated, and means rotatably connecting said second body to said first body, said aperture and said compartment being so disposed that, when said second body is rotated in one direction, at least a portion of said compartment registers with said aperture whereby water flowing through said aperture is discharged as a solid stream through said bottom opening, and, when said second body is rotated in the opposite direction, the perforated portion of said second body registers with said aperture whereby water flowing through said aperture is discharged as a spray through said perforated portion.

2. The structure recited in claim 1 in which said aperture is out of alignment with said bottom opening.

3. The structure recited in claim 1 in which said bottom wall includes a perforated portion which is at all times in registration with said bottom opening.

4. The structure recited in claim 1 together with a screen interposed between said bottom wall and said upper opening.

5. The structure recited in claim 1 in which said compartment is elongated.

6. The structure recited in claim 1 in which said first body is substantially cylindrical and said second body is substantially semi-spherical.

7. The structure recited in claim 1 in which said compartment is defined by a wall upstanding from a wall of said second body.

8. The structure recited in claim 1 in which said means is in the nature of a ring secured to said second body and rotatably mounted on said body portion.

9. The structure recited in claim 1 together with means for limiting the rotation of said second body in either direction.

10. The structure recited in claim 1 together with a pair of spaced stops carried by each of said first and second bodies for limiting the relative rotation of said bodies.

11. The structure recited in claim 1 in which said first and second bodies are made of a thermo-plastic substance.

12. A faucet attachment including a first body having an upper opening adapted to receive and engage the discharge end of a faucet or the like, and a bottom wall having a pair of spaced apertures therein, a second body having a bottom opening and means defining an elongated compartment within said second body including said bottom opening, at least a portion of said second body lying outside of said compartment being perforated, and means rotatably connecting said second body to said first body, said apertures and said compartment being so disposed that, when said second body is rotated in one direction, the opposite ends of said compartment register with said apertures whereby water flowing through said apertures is discharged as a solid stream through said bottom opening, and, when said second body is rotated in the opposite direction, only the perforated portion of said second body registers with said apertures whereby water flowing through said apertures is discharged as a spray through said perforated portion.

MAX DURST.